Oct. 30, 1962 A. B. BERESKIN 3,061,804

AUDIO TRANSFORMER

Original Filed June 30, 1954 5 Sheets-Sheet 1

INVENTOR
ALEXANDER B. BERESKIN

BY [signature]

AGENT

INVENTOR
ALEXANDER B. BERESKIN

BY W. H. Bruning
AGENT

Oct. 30, 1962 A. B. BERESKIN 3,061,804

AUDIO TRANSFORMER

Original Filed June 30, 1954 5 Sheets-Sheet 3

INVENTOR
ALEXANDER B. BERESKIN

BY

W. H. Breunig

AGENT

Oct. 30, 1962 A. B. BERESKIN 3,061,804

AUDIO TRANSFORMER

Original Filed June 30, 1954 5 Sheets-Sheet 4

INVENTOR
ALEXANDER B. BERESKIN

BY [signature]
AGENT

Oct. 30, 1962 A. B. BERESKIN 3,061,804

AUDIO TRANSFORMER

Original Filed June 30, 1954 5 Sheets-Sheet 5

INVENTOR
ALEXANDER B. BERESKIN

BY W. H. Breuning
AGENT

United States Patent Office 3,061,804
Patented Oct. 30, 1962

3,061,804
AUDIO TRANSFORMER

Alexander B. Bereskin, Cincinnati, Ohio, assignor to The Baldwin Piano Company, Cincinnati, Ohio, a corporation of Ohio

Original application June 30, 1954, Ser. No. 440,505, now Patent No. 2,924,780, dated Feb. 9, 1960. Divided and this application Feb. 1, 1956, Ser. No. 562,843
7 Claims. (Cl. 336—84)

This application is a division of my co-pending application Serial No. 440,505, filed June 30, 1954, and then titled "Audio Amplifier System."

The present invention relates generally to power amplifiers, and more particularly to wide band power amplifiers capable of utilization as high fidelity audio amplifiers.

The provision of amplifiers capable of amplifying a wide band of audio signals with minimum distortion at high power levels is of considerable importance commercially. The size and cost of a power amplifier together with its driver and power supply, are primarily a function of the efficiency of the power amplifier, and of its power sensitivity, when considered in relation to any specific audio power output. For a given amplifier tube type, which allows a given plate power dissipation, of the order of four times as much power output may be obtained, operating two tubes push-pull class B, as against class A. Therefore, while the operation of high fidelity amplifiers class B presents serious problems, since such amplifiers are prone to introduce distortion, the increase of efficiency and power output possible in this manner, when utilizing a specific tube type, provides a strong incentive to their development. A general technique for overcoming distortion is of course available, i.e. the introduction of negative feed-back into the amplifier system. The advantage of high efficiency operation also is reflected in the size of power supplies required to operate at a given power output, and therefore the cost per watt of output may be reduced both at the power supply and in the tube complement.

In order to obtain highest efficiency together with increased power sensitivity, the push-pull class B high fidelity amplifier may preferably employ tetrode vacuum tubes. Such tubes have higher output impedance than triodes, but the use of suitable feed-back compensates for the disadvantage. However, any tube type may be employed, and I do not desire to be limited to any specific type of tube in the practice of the present invention.

One of the major problems associated with class B operation is that which arises due to energy storage in the leakage reactance existent between primary windings of conventional type. A. P. Sah, in an article entitled "Quasi-Transients in Class B Audio-Frequency Push-Pull Amplifiers," Proceedings of the Institute of Radio Engineers, vol. 24, November 1936 pps. 1922—1541, has shown that the energy stored in this leakage reactance gives rise to a discontinuity of conduction at the point of transfer of current conduction from one tube to the other of a push-pull pair. This discontinuity is sometimes denominated a conduction transfer notch, and must be eliminated if class B operation is to be successfully employed, in high fidelity amplifiers. One solution resides in the elimination of leakage reactance, and various winding schemes have been suggested which accomplish this end with more or less success. Use of bi-filar windings for the two primary halves has been highly successful in this regard.

The use of bi-filar windings introduces problems in output transformer design. One of these is that high voltage may exist between adjacent wires of the bi-filar windings, and the wires must be adequately insulated to withstand the voltage. However, adequately insulated wire exists commercially, so that this problem is not insurmountable. A more significant and difficult problem is that considerable capacitance exists between the adjacent wires of a bi-filar winding, and that the capacitance must be charged in developing voltage difference between the wires, i.e. a voltage cannot exist without the requisite charge. The charging current must be supplied by the tubes of the output stage, and this necessity represents a major factor in limiting the high frequency power-delivering capacity of the amplifier. For example, in one specific design of a bi-filar transformer a capacitance of .045 microfarad was found to exist between primary windings, which leads, at a peak voltage of 500 volts cross the primaries, and at a frequency of 10 kc., to a peak charging current of 1.5 amperes, which may be beyond the capacity of the tubes employed.

A natural step to consider is the possibility that an inter-connection of the primary windings may be found which will enable a reduction of this charging current. The possibility must be envisaged, however, in conjunction with the further requirement that the cathodes of the power tubes are to be maintained at ground potential, in accordance with the present invention. It is found that sectionalization and reconnection of the primary windings does not reduce the charging current, and generally increases the voltage across some parts of the windings to compensate for a decrease at other parts, which increases the burden on the insulation. It would therefore appear that the solution, insofar as the amplifier of the present invention is concerned, must be met by suitably designing the output transformer, rather than by sectionalization and reconnection of the sections.

In general, the capacitance between two isolated parallel wires decreases radically with increase of spacing therebetween. In a transformer winding each wire has capacitance with respect to two wires on each side thereof, in the same layer, and also with respect to wires in the layers above it and below it. Effective capacitance between wires in the same layer may be cut in half by transposing the two wires of the bi-filar pair at every turn. Capacitance between wires in adjacent layers is not modified by this process, but since the capacitance between wires in the same layer accounts for two-thirds of the total transformer capacitance, the process does reduce the total transformer capacitance by one-third. As an alternative the windings may be random wound.

The capacitance between adjacent layers of windings may be reduced by increasing the spacing between the layers. This increases the leakage reactance of the transformer, but a balance may be attained of capacitance reduction with leakage reactance increase, by virtue of which capacitance may be decreased to a significant extent without introducing the undesirable conduction transfer notch to a noticeable extent. Obviously, definite limits exist in respect to the possibilities of this expedient.

The total number of turns and the core size may be reduced by the use of grained core material. This procedure enables interwinding capacity to be further reduced, and overall the total reduction made possible by utilization of the various recited features of the invention have enabled a capacitance of .01 microfarad to be attained, which is capable of operating at 60 watts output, with a peak to peak voltage of about 500 volts.

It is known to use bi-filar output transformers in push-pull power amplifiers operating class B. In the circuit of the present invention, however, and in distinction to known circuits of this type, the power tubes are operated with cathodes at a fixed reference potential, which usually is ground. No bias resistances, nor by-pass condensers, are present in the cathode circuits of the power tubes. This enables use of any combination of plate supply and screen voltage, and therefore simplifies the requisite power supply. There remains, however, the problem of providing suitable bias for class B operation. This problem is solved by employing a suitable driver circuit.

The driver circuit employed in conjunction with the grounded cathode class B amplifier of the present invention is a phase inverter employing two triodes having their cathodes connected together and via a common cathode resistance to a source of relatively high negative voltage. The anodes are supplied in parallel, via separate anode load resistances, to a positive source of relatively low voltage, which may be derived ultimately from the relatively high voltage supply for the screen grids of the power tubes, by means of a voltage divider connected from the screen grid to ground. The current drain on the voltage divider due to the phase splitter load is relatively constant, since the tubes of the phase splitter operate class A in push-pull relation. It follows that relatively constant voltage is available for the anodes of the phase splitter. One grid of the phase splitter is maintained at fixed potential with respect to ground, and the other driven from an unbalanced source of signal, the circuit parameters being so selected that class A operation is attained, and push-pull signal output is derivable from the anodes of the tubes. These anodes are, at the same time, at a D.C. potential selected so that the control grids of the power tubes may be connected directly thereto, and when so connected will operate class B, or adjacent thereto, and will never become sufficiently positive in response to driving signal that appreciable grid current will flow. Since the driver circuit as seen by the control electrodes of the power tubes is inherently a high resistance circuit, bias variation due to grid current flow is avoided, and grid current flow itself radically reduced. The use of a direct coupled driver possesses the advantage of simplicity of power circuitry, but still further, the advantage that coupling capacitors are eliminated from the circuit, which eliminates the possibility of instability of the system and of blocking of the power amplifier in response to excessive input signal, as well as the possibility of poor transient response due to coupling circuit time constants.

Negative feed-back is provided in the present system by means of a supplementary statically shielded secondary winding of the output transformer, which may be connected by means of a D.C. path in series with the signal drive circuit for one of the driver circuit grids. This is equivalent to stating that feed-back signal is connected in series with input signal. The magnitude of the feed-back voltage which may be provided, without causing any trace of instability is greater than 36 db. However, since the driving circuit voltage required under these conditions is too great, the circuit is normally employed with about 24 db of feed-back. As a variant signal input may be applied to one grid of the driver and feed-back voltage to the other, each in suitable phase relation.

The feed-back winding is very closely coupled to the normal output transformer secondary winding, but is electrostatically shielded from the latter. Thereby, the sole energy coupled into the feed-back winding is that due to magnetic coupling. It has been found that the amount of feed-back which can be employed is greatly reduced, if the electro-static shield is eliminated, because currents transferred to the feed-back winding capacitively may be of such phase as to tend to cause instability, and are a function of frequency. The feed-back circuit, in accordance with the present invention, looking from the primary winding of the output transformer, to the signal input grids of the power amplifier, includes no capacitive element, at any point in the feed-back loop, so that there is less tendency toward instability, even for extreme values of feed-back voltage.

Amplifiers constructed in accordance with the teachings of the present invention have been found to be remarkably insensitive to supply voltage variations. For example, when operated with well regulated screen and plate supply voltages, the residual hum in the output was 96 db below 50 watts. When a ripple voltage of 42 volts was inserted in series with the plate supply, or 9 volts in series with the screen supply, the residual hum increased to only 80 db below 50 watts.

On the basis that input signal is set to the value necessary to produce 2 percent distortion in the output, and employing a pair of 1614 type tubes in the power amplifier, about 60 watts of output may be delivered by the system, in the range 40 to 4000 c.p.s. At the lower frequencies output is limited by the inability of the tubes to supply adequate magnetizing current. In the intermediate range output is limited by peak clipping due to the inability of the driver tubes to drive the grids of the power tubes positive, and at the high frequencies output power is limited by the inability of the power tubes to supply the charging current required by the inter-winding capacity. At the low end of the range, the amplifier has a drop-off rate of 9 db/octave while at the high end it approaches a drop-off rate of 6 db/octave, which is completely adequate for high fidelity audio operation.

Most of the power in speech, song, and music is contained in the fundamental tones, with frequencies below 3000 cycles/sec. The power levels of the higher frequency fundamental tones and of the harmonics of the lower frequency fundamentals drop off at a greater rate than the power-delivering capacity of the present amplifier. It results, therefore, that the power-delivering capacity of the amplifier is fully adequate for all audio frequency signals. Test results show that the amplifier is capable of developing its full power output of 60 watts over most of the middle frequency range with total plate circuit losses, including transformer losses, considerably lower than rated values. In certain tests, the screen dissipation exceeded the rated value by about 7 percent, but only when the amplifier was being over-driven, to obtain a 2 percent distortion level. A reduction of 3 watts in the output power, over most of the range, brings the harmonic distortion below 1 percent, and the screen dissipation safely below the rated value. The maximum plate circuit efficiency occurs in the 500–1000 cycle/sec. range and is 65.2 percent. This value includes the output transformer losses, and is remarkably close to the ideal or theoretical value of 78.5 percent for class B operation, which does not include transformer losses.

The power supply construction required for the amplifier of the present invention may be extremely simple. For example, filter chokes are not necessary in either the plate or the screen supply circuits. A single type 5U4–G rectifier tube, operating within manufacturer's ratings, is adequate to supply the plate circuits of the power tubes, due to the high efficiency of operation of the latter. A single 6X4 type rectifier tube supplies the power required by a pre-amplifier and the screens of the power tubes, and a single 6X4 type rectifier supplies the negative voltage required by the driver.

The pre-amplifier employed consists of a two-stage resistance-capacitance coupled amplifier, the first stage of which includes an un-bypassed relatively low cathode resistance, and an internal feed-back loop is provided between the second plate and the first cathode, which establishes good wave shape and low output impedance. The pre-amplifier is coupled to the driver grid by means of a condenser and choke coil in series, having low D.C. resistance and a low Q resonance between 10 and 15 cycles per second. The low D.C. resistance is essential to prevent driver grid current changing the bias relations of the phase inverter. Feed-back from the output transformer secondary is also incorporated, from a tap of the secondary output to the first cathode of the pre-amplifier, the coupling circuit including a simple series capacitor. This capacitor has no observable effect on low frequency response, and is found to reduce the tendency of the amplifier to ring with sharp rise time square wave inputs. More complex circuit such as bridged-T networks may be used for the same purpose, since the time constant of this feed-back circuit may be made extremely low.

In order to isolate the direct drive of the inverter stage from the main feed-back drive, while retaining a common point of reference for both in the system, the former may drive one of the tubes of the inverter and the latter may drive the other. The amplifier then includes three separate feed-back loops, a first extending from the output transformer to that side of the phase inverter driver stage which is not supplied with signal input, a second extending from the output transformer to the cathode of the first stage of the pre-amplifier, and a third extending from the second anode of the pre-amplifier to the first cathode of the pre-amplifier.

It is accordingly, a broad object of the present invention to provide a novel amplifier capable of high power output over a wide frequency band.

It is another object of the invention to provide a novel amplifier of the class B type, which utilizes a pair of vacuum tube devices connected in push-pull relation, which operate with cathodes grounded.

It is a further object of the present invention to provide a novel class B power amplifier which provides high power output, at greater than 50 percent efficiency, with relatively low distortion, over a relatively wide band of frequencies.

Another object of the invention resides in the provision of a novel negative feed-back system for a push-pull power amplifier, which includes a statically shielded winding in the output transformer of the amplifier.

Still another object of the invention resides in the provision of a novel negative feed-back system for a power amplifier, including a statically shielded secondary winding in the output transformer, and a phase inverter driver, directly coupled to the power amplifier, in a negative feed-back loop.

A further object of the invention resides in the provision of a novel pre-amplifier having provision for internal negative feed-back, and for the introduction of a further negative feed-back voltage via a feed-back loop extending from the output secondary winding of the output transformer of a power amplifier which is supplied with signal by the pre-amplifier.

Still a further object of the invention resides in the provision of a novel power amplifier which is substantially free of hum output due to power supply hum input of considerable amplitude, enabling utilization of a relatively inexpensive filter in the power supply of the system.

It is a further object of the present invention to provide a novel high fidelity amplifier which employs a push-pull output transformer having bi-filarly related primary halves, in which the transformer is designed for minimum interwinding capacitance.

Another object of the invention resides in the provision of a novel push-pull power output transformer having bi-filarly wound primary halves and having provision for reducing the capacitance between the primary halves without introducing thereby appreciable leakage reactance.

It is a further object of the invention to provide a novel power transformer having bi-filar windings, in which the adjacent conductors of the bi-filar windings are periodically transposed in order to reduce inter-winding capacitance.

It is a further object of the present invention to provide a novel transformer employing bi-filar windings, in which the bi-filar windings are transposed at random, to reduce inter-winding capacitance.

The above and still further features, advantages and objects of the invention will become apparent upon consideration of the following detailed description of a specific embodiment thereof, especially when taken in conjunction with the accompanying drawings, wherein.

Figure 1:
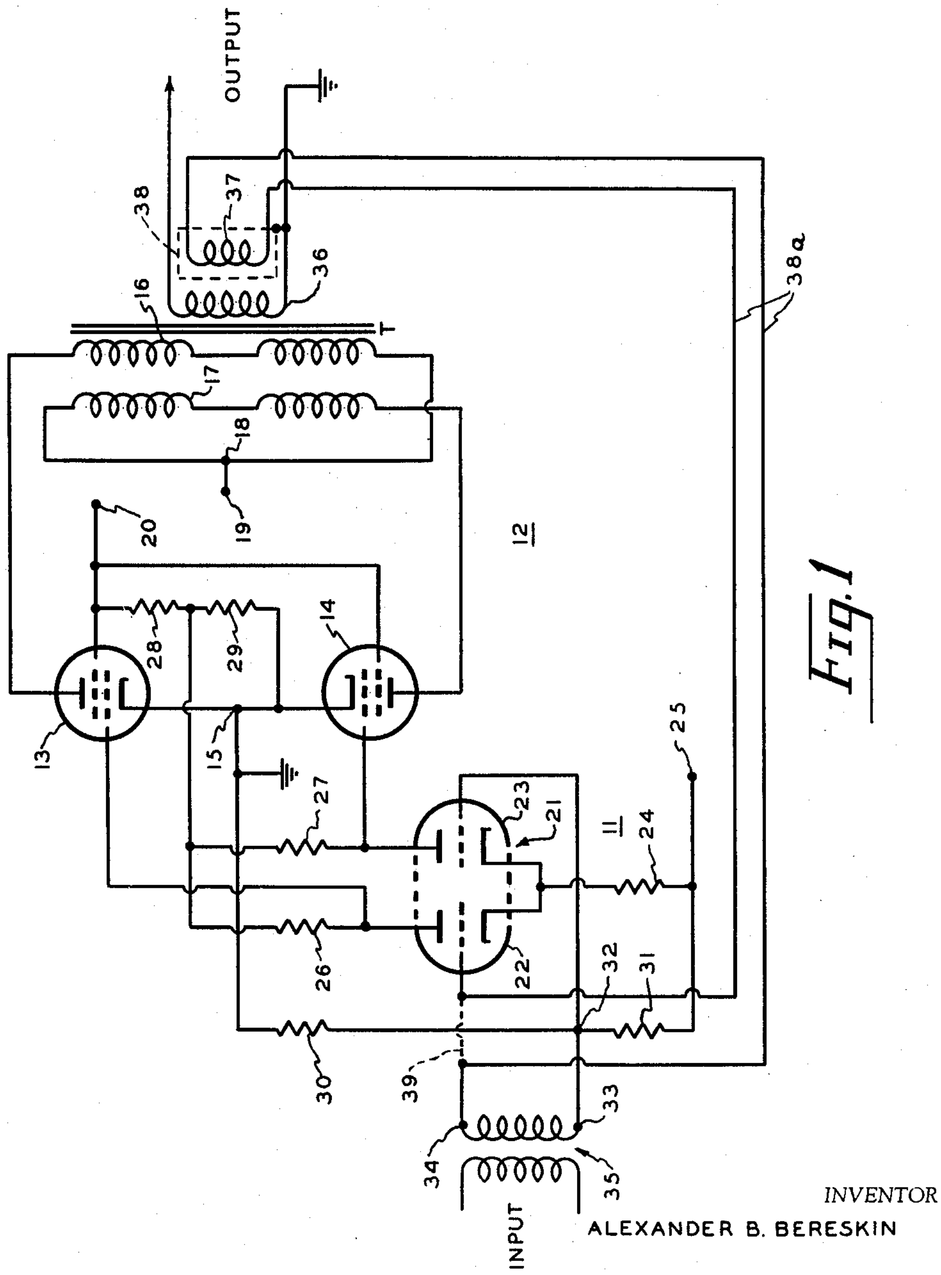
FIGURE 1 is a simplified schematic circuit diagram of a power amplifier and driver, arranged in accordance with the present invention.

Referring now more particularly to FIGURE 1 of the accompanying drawings, the reference numeral 11 denotes a twin triode driver stage of the phase inverter type, which drives a push-pull power amplifier 12 of the class B type. The power amplifier 12 comprises a pair of vacuum tubes 13, 14, which may be of one of the types commercially known by the type designations 6L6, 1614 or 807 for example only. The cathodes of the amplifier tubes 13, 14 are connected directly to a point of reference potential, conventionally represented at ground, 15. The anodes of the tubes 13, 14 are connected respectively in series with transformer primary halves 16, 17, a common point 18 of which is connected to a source of positive voltage represented by the terminal 19.

The vacuum tubes 13, 14 may be of the tetrode type, and more specifically may be of the beam power type. The screen grids of the vacuum tubes 13, 14 are connected jointly to a source of screen voltage represented by the terminal 20. As will appear hereinafter, the sources of anode and screen voltages employed are not critical, and need not be severely filtered to remove voltage at power frequency, nor need these voltages be regulated. Recommended values for one of the recommended tube types, noted for the sake of example only, are 550 v. anode voltage and 350 v. screen voltage.

The driver stage 11 comprises a twin triode vacuum tube, 21, which may be of the 12AX7 type, for example, and have triode sections 22, 23. The cathodes of the triode sections 22, 23 are connected together and via a resistance 24 to a source of negative voltage, represented by the terminal 25. The latter may have a value of −180 v., in one specific design of the present system. The anodes of the triode sections 22, 23 are separately connected via anode load resistances 26, 27 to the junction of two resistances 28, 29, which extend in series between the terminal 20 and the ground point 15. The resistances 28, 29 in series constitute a voltage divider, and may have values of approximately 100K and 5K, respectively, so that the voltage with respect to ground which is supplied to the anode circuits of the triode sections 22, 23 is of the order of 10 v. This relatively low value of anode supply voltage is, of course, feasible because the cathodes of the triode sections 22, 23 are operated at a relatively high negative voltage.

The anodes of the triode sections 22, 23 are connected directly with the control electrodes of the power amplifier tubes 13, 14, respectively, i.e. without the interposition of capacitance so that the steady voltages on the anodes of the triode sections 22, 23 establish the control electrode bias voltages for the power amplifier tubes 13, 14. The bias voltage may, by selection of voltage supply values, operating conditions and circuit parameters for the triode sections 22, 23, be established at a value suitable for class B operation of the power amplifier tubes 13, 14, or at some other value which establishes high efficiency operation. More specifically, a quiescent anode current for the power amplifier tubes 13, 14 may be established at about 15 ma., although I do not desire to be limited to any specific value.

The bias voltage for the control electrode of the triode section 23 may be established by a voltage divider, comprising resistances 30, 31 connected in series between the ground point 15 and the negative voltage terminal 25. The control electrode of triode section 23 is connected to the junction 32 of the resistances 30, 31, and the values for these resistances are selected to establish a bias voltage suitable for class A operation. The junction 32 is connected directly with one input terminal 33 of the amplifier. The remaining input terminal 34 may be connected directly to the control electrode of the triode section 22, and if it be assumed that the terminals 33, 34 are connected to the secondary windings of a signal input transformer 35, the control grids of triode sections 22, 23 are driven at least approximately equally.

In operation, input signal applied at terminals 33, 34 varies the voltage of the control electrode of triode section 22 about the quiescent value established by the voltage divider 30. The cathode of the triode sections 22, 23 follow the resultant current variations in the triode section 22, and transfer an effective out-of-phase signal voltage between the cathode and control electrode of the triode section 23. The triode sections 22, 23 thus operate as a phase splitter suitable both for establishing bias for, and driving, the power tubes 13, 14, and the source of screen voltage for the power tubes, 13, 14, is utilized as an anode source for the triode sections 22, 23.

The windings 16, 17 of the output transformer T are bi-filarly related, and the design of the transformer T is an important feature of the present invention. The effect of the transformer design on amplifier operation will be discussed hereinafter. For the present, it is noted that the transformer T includes an output secondary winding 37, which is not directly tied to ground. The feed-back winding 37 is statically shielded by means of a static shield 38, connected to a point of reference potential, i.e. ground. The feed-back secondary winding 37 may be connected, via leads 38a, in series with the secondary winding of a signal input transformer 35, by breaking the lead between the terminal 34 and the control electrode of the triode section 22, and then connecting leads 38a to the break points respectively, as at 39. It may be noted that the feed-back loop constitutes a D.C. path.

The utilization of a shield 38 about the feed-back winding 37 eliminates voltages from that winding which might otherwise be present, due to capacitive coupling otherwise existent between the feed-back winding and the other windings of the transformer. Such voltages may be of considerable magnitude, in a transformer operating at high voltage and power, and may be of improper phase to provide degeneration, but instead may lead to instability. The fact that only induced voltages due to transformer magnetic flux variations exist in the secondary winding 37, and that the entire feed-back loop from feed-back winding 37 to the input of power amplifier 12 includes no capacitive circuit elements, enables use of a tremendous value of feed-back, i.e. about 36 db. Much less than this value of feed-back may be employed in practice, in order to reduce the required input signal, and since the stated value is found to be greater than is required in practical designs, and about 24 db of feed-back is recommended in practice. Nevertheless, the overall design of the amplifier, by enabling use of such large values of feed-back, permits also a considerable simplification of power supply system, and therefore of overall cost.

The power sources connected to the terminals 19, 20 and 25, respectively are in no sense critical, and need not be regulated, nor severaly filtered, and in fact very heavy ripple voltages of the order of 42 volts in the anode supply and 9 volts in the screen supply may be tolerated, and produce no appreciable output signal. It is this fact which enables the same power terminal 20 to be employed to supply screen voltage and bias to the power tubes 13, 14 and anode supply voltage for the triode sections 22, 23.

The elimination of coupling and D.C. isolating capacitors for the amplifier circuit proper also eliminates the possibility of blocking of the amplifier during transient overloads, and in general contributes to excellence of transient response of the amplifier.

In general, it is not desirable to supply the input signal to a power amplifier by means of an input transformer as in FIGURE 1 of the accompanying drawings, and the problem therefore exists of driving the driver stage 11 from a pre-amplifier which is coupled with the input of the driver stage otherwise than by means of a transformer. The transformer 35 is, therefore, included in the circuit of FIGURE 1 in the interest of simplicity of illustration and exposition.

Figure 2:
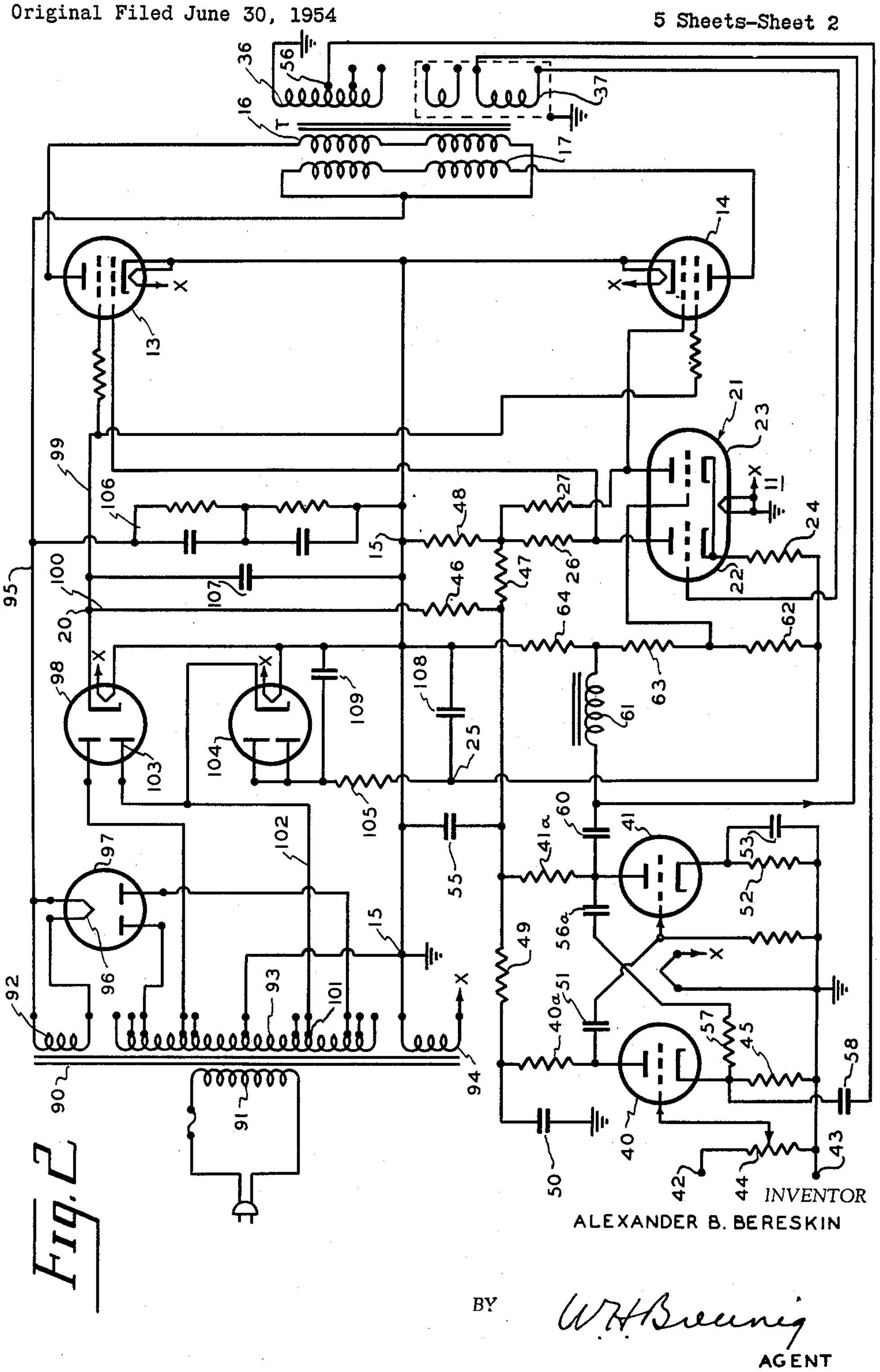
FIGURE 2 is a schematic circuit diagram of a complete amplifier in accordance with the invention, including power rectifiers, pre-amplifier, power amplifier and driver.

Reference is now made more particularly to FIGURE 2 of the accompanying drawings, which illustrates a modification of the amplifier illustrated in FIGURE 1 of the accompanying drawings, together with a suitable preamplifier, and rectifier power supplied.

Considering first the preamplifier arrangement, there is employed a pair of cascaded triodes 40, 41, although other suitable vacuum tubes such as tetrodes or pentodes may be employed. Input signal is applied between a terminal 42 and a point of reference potential, 43, which may be ground (as is point 15), across a variable volume control potentiometer 44. The variable contact of the potentiometer 44 is connected directly to the control electrode of the triode 40. The cathode of the latter is connected to the reference point 43 via an unby-passed resistance 45 and its anode is plate loaded by a resistor 40a supplied from the terminal 20, via a suitable voltage divider consisting of resistance 47, and resistance 48 connected in series to reference point 15. Anode potential is taken from the junction of resistances 46 and 47, and is supplied to the anode load resistor 40a in series with a resistance 49. A filter capacitor 50 is connected from the high potential end of resistance 40a to the reference point 43.

The signal voltage present at the anode of triode 40 is transferred to the control electrode of the triode 41 via a coupling capacitor 51, the circuit of triode 41 including a cathode resistance 52, by-passed by a capacitor 53, so that resistance 52 acts only to supply bias. The triode 41 is anode loaded by a resistance 41a, and supplied with anode voltage from the junction of resistances 47 and 49. This anode voltage is filtered by a capacitor 55. An internal feed-back loop exists between the anode of triode 41 and the cathode of triode 40, consisting of a capacitor 56a and a resistance 57 connected in series. A further overall feed-back loop exists, in the form of a connection from a tap 56 on secondary winding 36, via capacitor 58, to the cathode of triode 40. At the same time distortion introduced into the transformer output power by the preamplifier may be eliminated, by the negative feed-back. It is an important feature of the preamplifier design that the same point, i.e. the cathode of triode 40, may be utilized for both internal and external negative feed-back voltage insertion.

The output of the preamplifier is supplied to the control electrode of the triode section 22 by means of a capacitor 60 and choke coil 61, extending in series from the anode of the triode 41 to a point on a voltage divider which establishes the bias for the triode sections 22, and 23. This voltage divider includes three resistances, 62, 63, 64, connected in series from terminal 25 to the reference point 15. It will be recalled that the common cathode load 24 for the cathodes of triode sections 22, 23 extends to the negative supply terminal 25. The feed-back winding 37 is connected between the control electrode of the triode section 22 and the junction of capacitor 60 and choke coil 61. The control electrode of triode 23 is connected to the junction between resistances 62 and 63, and the choke 61 extends from the capacitor 60 to the junction of resistances 63 and 64.

The capacitor 60 and the choke 61 have a low Q resonance at 10 or 15 cycles, i.e. below the pass band of the amplifier, and provide an extremely low resistance coupling circuit, of relatively high inductive reactance. This is of importance because the triode section 23 draws grid current when its grid voltage becomes more positive than −1 volt, and this grid current must not be allowed to upset the bias relations in the phase inverter 21.

I now turn to consideration of the output transformer of the present invention, its construction, and arrangement and the design consideration affecting these.

It is well known to use bi-filar output transformers, in wide band audio power amplifier systems intended for high fidelity operation. See, for example, the article by F. H. McIntosh and G. T. Gow, entitled, "Description and Analysis of a New 50-Watt Amplifier Circuit," published in Audio Engineering, December 1949. However, the McIntosh circuit does not operate with the cathodes of its power amplifier tubes at ground or at the same fixed reference potential, and the design of the McIntosh circuit is such that certain problems of charging transformer capacitance are avoided, which cannot be avoided if the cathodes are to be grounded. In the present system it is desired to utilize amplifier tubes, in the power stage of the transformer which operate with cathodes at ground, or at fixed reference potential, because this makes possible use of a relatively inexpensive power supply system. The power output tubes are plate loaded only, and the two primary windings of the transformer are bi-filarly related in order to reduce leakage reactance and thereby to improve performance. In particular this design serves to eliminate the conduction transfer notch, due to leakage reactance, and which has been a serious problem in output transformer design, in class B amplifier.

The use of bi-filar windings in the present system introduced new problems which were not previously important. One of these problems is that appreciable peak voltage may be required to exist between adjacent wires of a bi-filar winding, and these voltages cannot exist unless the winding-to-winding capacitance has been charged. The charging current must usually be supplied through the output power tubes, and may be a major factor in limiting the high frequency power-delivering capacity of the amplifier.

It can be shown, in particular, for the arrangement illustrated in the circuits of FIGURES 1 and 2, that the peak voltage existing from end to end of one primary coil is also half the voltage existing between all corresponding or adjacent points of the two primary windings. This voltage may be about 500 v., and the capacitance involved may be about .045 microfarad, in the absence of special transformer features. A peak charging current of 1.5 amperes is required to charge the stated capacity to the stated voltage, assuming a sine wave at 10 kc., and this is beyond the power delivering capacity of the tubes involved. Attempts have been made to reduce the capacity of the windings by sectionalizing the windings, and adopting various section interconnections. These have not succeeded, in general, and have introduced new problems of interwinding insulation, and the like, by introducing high voltages at certain portions of the winding.

In the general case of two isolated paralleled circular wires an increase of the spacing of the wires, from 10 percent to 100 percent of the diameter of the wire, will reduce capacitance between wires by approximately 70 percent. If the adjacent surfaces are separated by only from 10 percent to 20 percent of the wire diameter, a decrease of interwire capacity of about 30 percent may be attained.

It is true that in a transformer one does not deal with two parallel adjacent wires, but the general principle remains applicable. Each conductor of the transformer will have capacitance to the wires on either side thereof, and to the wires in the layers above and below it. The capacitance between wires in the same layer may be reduced 50 percent by transposing the two wires of the bi-filar winding at every turn. A somewhat smaller reduction may be attained by random transposition. The capacitance between adjacent layers is not reduced in this manner. In the non-transposed winding, assuming the same spacing between layer centers which exists between adjacent wire centers in a layer, and assuming uniform dielectric material, the capacitance between the wires in the same layer accounts for about two-thirds of the total capacitance, and the capacitance between adjacent layers accounts for the remaining one-third. Since the transposition of wires can be expected to cut in half the capacitance between wires in the same layer, this expedient reduces the total capacitance of the windings by a factor of one-third.

The capacitance between adjacent layers may be reduced by increasing the spacing between the layers, at the cost of some increase of leakage reactance. However, an increase of this spacing leaves the transformer bi-filarly wound, and it has been found in practice, that the resultant increase in leakage reactance is not such that the conduction transfer notch appears.

Figure 3:
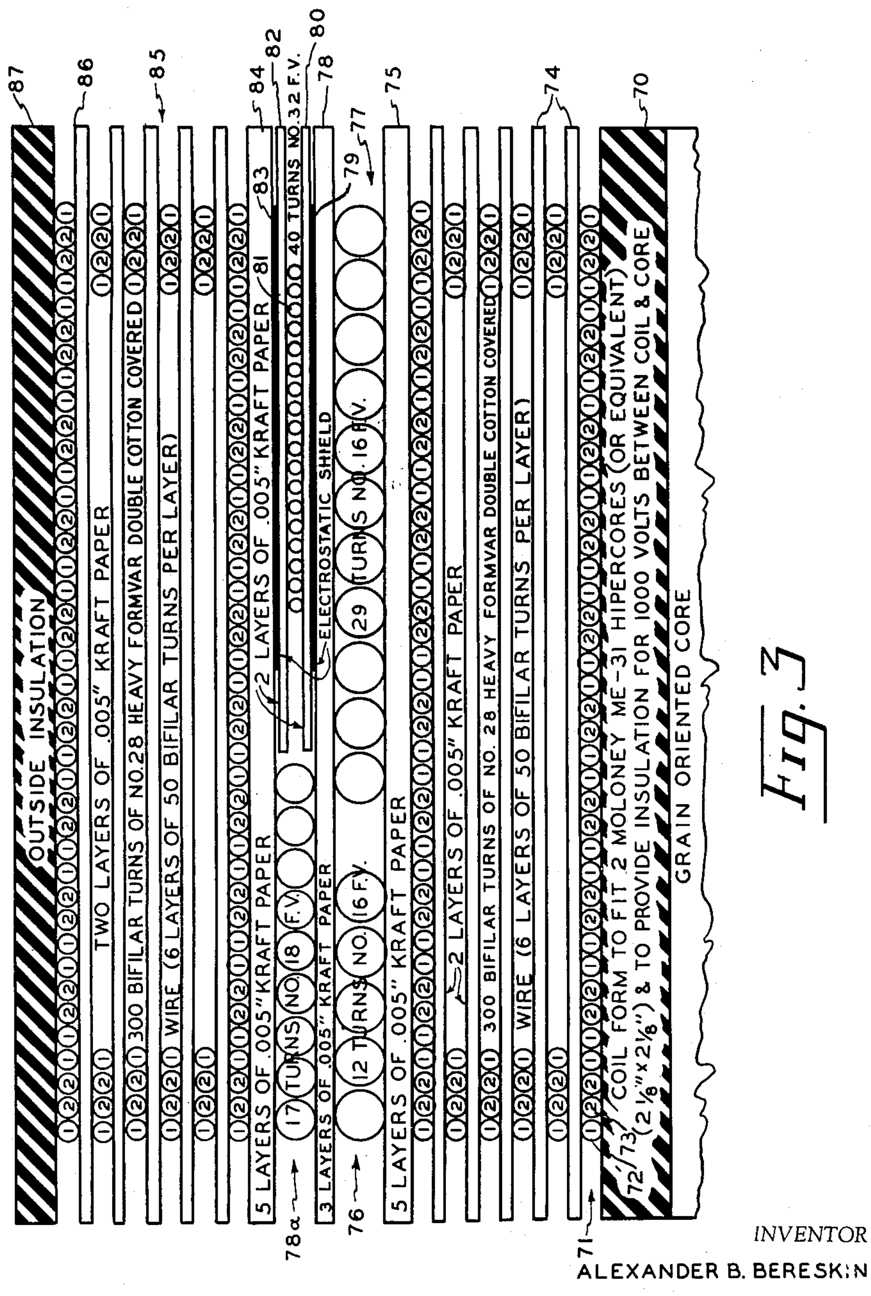
FIGURE 3 is a view in cross section taken through the windings of the output transformer of FIGURES 1 and 2, illustrating the mechanical arrangement and the winding buildup.

The transformer winding which was evolved in accordance with the principles of the present invention was designed to be employed with two-grain-oriented Hipersil cores Moloney ME–31 Hipercores, or equivalent) and FIGURE 3 of the accompanying drawings illustrates the coil buildup, being proportioned to scale vertically but not horizontally. Various transformers, constructed in accordance with the principles of the present invention, and tested for capacitance, showed an inter-primary capacitance of about .01 microfarad. This low value is attained directly by (1) transposing alternate turns within each layer, (2) spacing adjacent layers sufficiently, and indirectly by (3) employing grain-oriented cores. It has been found that the use of non-grain-oriented cores renders it necessary, for the same low frequency standard of performance, to increase the core cross section and the number of turns by about 25 percent, and the combined effect increasing primary interwinding capacitance by about 50 percent.

Turning now more particularly to FIGURE 3 of the accompanying drawings, the reference numeral 70 represents a cross section taken through one wall of a cylindrical coil form, designed to fit two Moloney ME–31 Hipercores, or equivalent, and to provide insulation for 1000 volts between coil and core. Wound on the coil form 70 is a first, or inner layer of bi-filar winding 71, comprised of fifty bi-filar turns of No. 28 Formvar double cotton covered wire, one of the wires 72 of each bi-filar pair being indicated as 1, and the other 73, as 2. It will be clear that each turn has its wires 1 and 2 transposed, i.e. wire 1 appears first to the left and then to the right of wire 2, in alternate turns of each layer, so that this alternation of transposition continues across the coil. In all six such layers are employed, and adjacent layers are separated from one another by two layers 74 of .005″ kraft paper, except centrally of the coil buildup, where certain secondary windings are inserted. After the first six layers 71 have been wound, a covering 75 of five layers of .005″ kraft paper are laid thereon, and on the covering 75 is wound two secondary windings 76 and 77 in the same layer, the secondary winding 76 consisting of twelve (12) turns of No. 16 F. V. insulated wire, and the secondary winding 77 of twenty-nine (29) similar turns. The covering 78 may be provided for the secondary windings 76 and 77, consisting of three layers of .005″ kraft paper, and a third secondary winding 78*a* may be wound on the latter, consisting of seventeen (17)

turns of No. 18 F. V. insulated wire, and extending about half the axial length of the coil.

Also superposed on the covering 78 is a layer 79, of metallic or other highly electrically conducting material, extending laterally a little less than half the length of the coil. The conducting layer 79 is covered by two layers 80 of .005″ kraft paper, and on the latter is wound forty (40) turns of No. 32 F. V. insulated wire, in a single layer. The latter is covered by two layers 82 of .005″ kraft paper, and superposed on the latter is another layer of highly conducting material 83, such as metal or the like. A heavy covering 84 of insulating spacer, consisting of five layers of .005″ kraft paper is then placed about the secondary winding 79 and about the outer conductive layer 83. The dimensions of the wire and coverings interposed between the paper coverings 78 and 84 are such that the layer 84 may lie flat and true.

Superposed on the covering 84 are six additional layers 85, of bi-filar winding, similar in arrangement to the layers 71, i.e. with the wire transposed after each turn, and with the successive layers separated by two layers 86 of .005″ kraft paper. The entire coil buildup may then be wrapped with outside insulation 87, of suitable character.

The winding 81 constitutes the statically shielded feed-back winding 37 of FIGURE 1, and the separate conductors of the six layer bi-filar windings constitute the primary halves of FIGURES 1 and 2. The several secondary windings 76, 77, **78*a***, may be interconnected in series, and taps brought out from the junction points, to provide output windings of various effective impedances.

To be noted are the relatively symmetrical location of the feed-back winding 81, between the primary winding halves, and the fact that alternate turns of the latter are transposed. The shield 79, 83, is the basic element which serves to isolate the feed-back winding statically, so that the total feed-back voltage is that induced magnetically, in response to current flow in the primary windings. Further, the shield 79, 83 would, of course, accomplish this object of itself, were the windings not transposed. The feed-back winding 81, being adjacent the several secondary windings is more closely coupled to the latter than might otherwise be the case, and hence responds to output current delivered by the transformer. This increases the accuracy of feed-back in some degree.

As mentioned in the above general discussion pertaining to the design of a transformer in accordance with my invention, a reduction in capacitance between wires in the same layer may be attained by random transposition. Examples of such transposition are illustrated in FIGURES 4 and 5.

Figure 4:
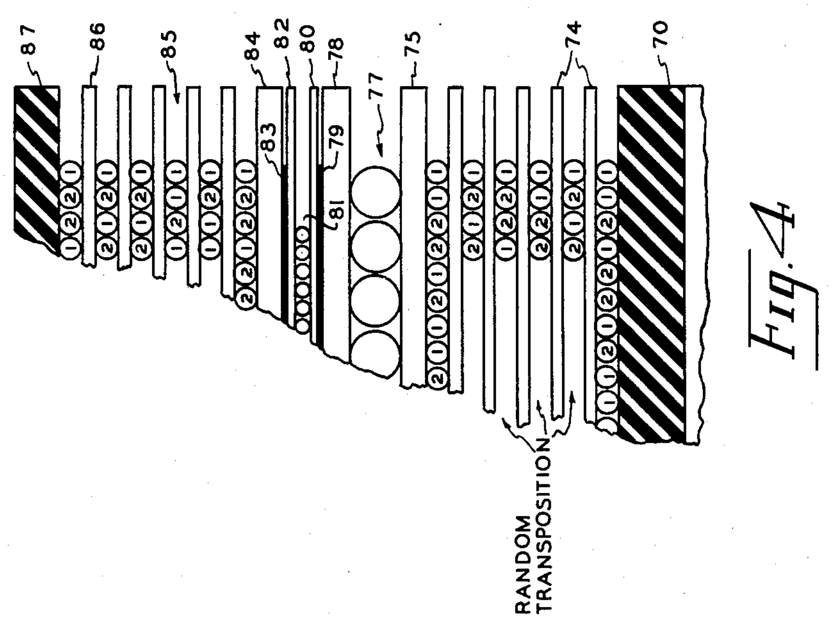
FIGURE 4 is a partial view in cross section taken through the windings of an output transformer alternative to that of FIGURE 3.
Figure 5:
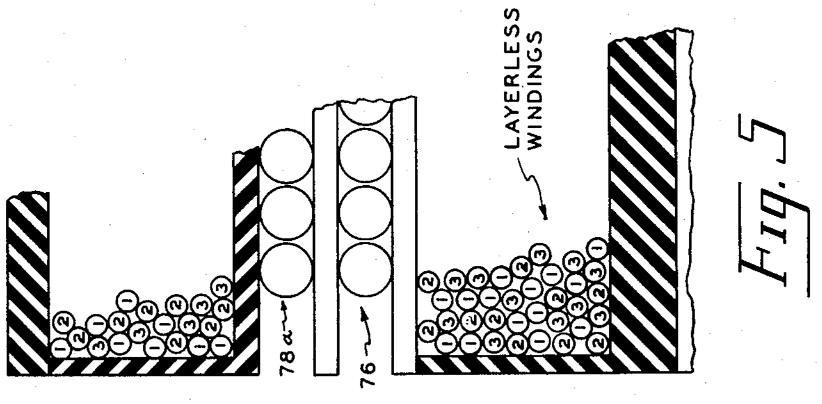
FIGURE 5 is a partial view in cross section of a further variation in the windings of an output transformer in accordance with my invention.

Referring to FIGURE 4, a portion of a winding similar to that illustrated in FIGURE 3 is shown, except that the transposition of the wires within a given layer of the winding is carried out in a random manner. The randomness may be extended throughout the primary winding and it will be noted that elements in FIGURE 4 are numbered the same as the corresponding elements of FIGURE 3. It will be obvious that such randomness could be carried on into the outer section of the primary winding.

Good results may also be achieved by using a random (layerless) bi-filar winding. FIGURE 5 shows a winding of this type, with the addition of a low-dielectric-constant, non-conducting fiber or filament designated as 3. This filament is wound along with the bi-filar elements 1 and 2 and is for the purpose of controlling the inter-winding capacitance.

The diameter of the fiber 3 may be of any suitable size comparable to the diameter of the wires 1 and 2, and it is determined by a compromise between the size of the overall winding and the extent to which the inter-winding capacitance is to be reduced. As is the usual practice in producing a layerless winding, a coil form such as that designated at **70*a*** is required to retain the wires at the ends of the winding. The outer section of the primary may be wound in a similar manner, the secondary and feed-back windings being similar to those of FIGURE 3.

The examples of windings illustrated in FIGURES 3, 4, and 5 are merely illustrative of the variations which a transformer in accordance with my invention may assume.

Returning now to FIGURE 2 of the accompanying drawings, the power supply for the present system includes a transformer 90, having a primary winding 91 and a plurality of secondary windings 92, 93, 94. The center tap of transformer secondary winding 93 is connected to ground point 15. Also connected to point 15 is one end of the secondary winding 94, which may supply current to various heaters marked X. The secondary winding 92 is connected at one end to the high voltage line 95, which supplies the amplifier tubes 13 and 14, and supplies power to a filament 96 of a double diode rectifier tube 97. The anodes of the rectifier tubes 97 are connected to points of opposite phase and equal amplitude of the secondary winding 93. The rectifier tube 97, which may be of the 5U4 type, has the sole function of supplying power to the anodes of the power amplifier tubes 13, 14, via lead 95.

A further double diode rectifier tube 98 is connected at its anodes to points of opposite phase of the transformer secondary winding 93, and supplies positive screen voltage at its cathode for the power amplifier tubes 13, 14, via lead 99, and anode voltage for the twin triode 21 via lead 100. This same lead delivers voltage to the pre-amplifier anodes of triodes 40 and 41. The double diode 98 may be of the 6X4 type.

A tap 101 is taken from the transformer secondary winding 93, for connection via lead 102 jointly to one anode 103 of double diode 98 and to the cathode of a rectifier tube 104. The anodes of the rectifier tube 104 are connected together and via a resistor 105 to point 25, which is in turn connected via cathode load 24 to the cathodes of the twin triode 21. The rectifier tube 104, then, supplies negative voltage to the point 25.

It will be noted that the power supply is not regulated, and does not include any choke filters, but only capacitive filters. So the RC filter 106 filters voltage on the lead 95, a single filter capacitor 107 is employed to filter the voltage on lead 99, and the capacitors 108 and 109 serve to filter the negative voltage supplied to point 25. The use of relatively slight filtering is made possible by the unresponsiveness of the system to hum voltage in the voltage supply leads, as has been pointed out hereinbefore, and the fact that a relatively poorly filtered supply may be employed, as well as the fact that the system operates at high efficiency, enables an output of about 60 watts to be attained, without overloading the power supply or the output power tubes.

Figure 6:
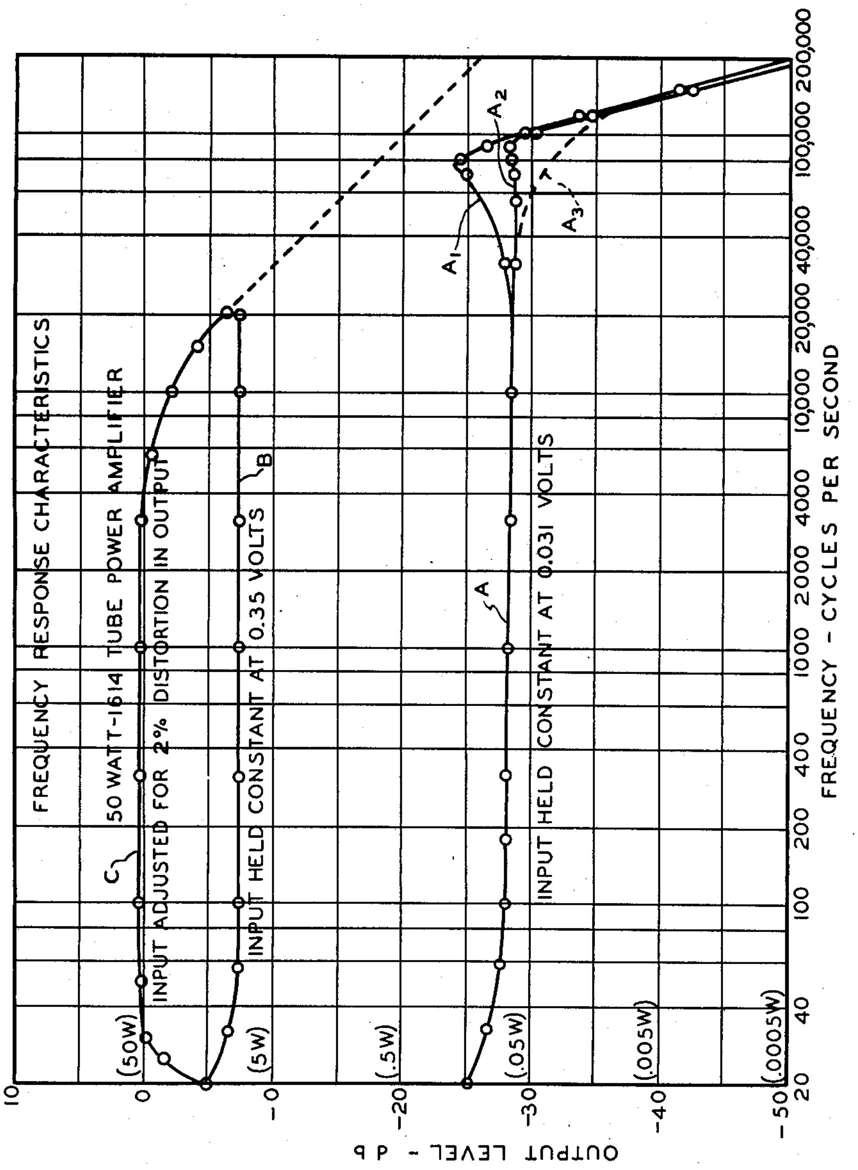
FIGURE 6 is a series of curves illustrating the performance of the amplifier of FIGURE 2.

The frequency response curve of the amplifier is illustrated in FIGURE 6 of the accompanying drawings, plotted in terms of output level in db for the frequency range 20 to 200,000 cycles per second, and utilizing 50 watts as a reference output level. Curve A shows the output in db over the frequency range, when input is held constant at .031 volt, the portion A1 being derived when the capacitor 58 is 0, the portion A2 being produced when the capacitor 58 is 15 mmfd. and the portion A3 being for Gaussian response with minus 3 db at 75 kc. (for comparison purposes). Curve B shows the response in db for an input of .35 volt over the range 20 to 20,000 cycles per second. Curve C shows the output which results when input is adjusted to a level sufficiently high to introduce 2 percent distortion in the output. This curve was experimentally plotted to 20,000 cycles per second, and extrapolated beyond.

It is well known that most of the power in speech, song, and music is contained in the fundamental tones with frequencies below 3,000 cycles per second. The power levels of the higher frequency fundamental tones and of the harmonics of the lower frequency tones decrease rapidly as the frequencies become greater than 3,000 cycles per second. Studies of the power requirements for various frequencies of speech, music, and the like have been made. On the basis of these studies, conducted in connection with a plurality of musical instruments and combinations thereof, curves have been compiled showing the maximum power requirement which may be expected at each frequency. On the basis of these requirements it has been shown that the amplifier of the present invention has adequate power delivering capacity at all frequencies, excellent transient response, and excellently low harmonic and inter-modulation distortion, and is capable of delivering about 50 watts of substantially undistorted power over those portions of the audio frequency spectrum which require maximum power.

While I have described and illustrated specific embodiments of the present invention, it will be clear that variations of arrangement and detail may be resorted to without departing from the true scope of the invention as defined in the appended claims. In particular I desire it to be understood that while I have disclosed my invention as applied to a class B or similar high efficiency amplifier, the system may be employed to advantage in amplifier types operating class AB, or A, subject to consequent reduction of efficiency.

What I claim is:

1. A wide band audio transformer for use as an output transformer of a power amplifier, said transformer having primary windings on a common core consisting of a first primary winding having two ends, and a second primary winding having two ends, said first and second primary windings being bi-filarly related, said first primary winding having a first positive voltage terminal and a first anode terminal, said second primary winding having a second positive voltage terminal and a second anode terminal, the ends of said first and second primary windings to which said first anode terminal and said second positive voltage terminal are connected respectively being immediately adjacent, the second anode terminal and said first positive voltage terminal being connected respectively to the remaining ends of said primary windings, said primary windings consisting of a plurality of turns of bi-filarly related conductor pairs, said turns having a common axis, each conductor pair consisting of a first conductor and a second conductor, said plurality of turns being arranged to include at least portions having one relative orientation of the first and second conductors with respect to a predetermined direction along said axis and at least other portions having an opposite relative orientation of the first and second conductors with respect to said predetermined direction along said axis, at least portions of the second conductors of different turns being immediately adjacent each other and at least portions of the first conductors of different turns being immediately adjacent each other by virtue of said relative orientations of said first and second conductors with respect to said predetermined direction along said axis.

2. A transformer according to claim 1 wherein said primary windings occupy successive layers of winding of said transformer, and insulating sheet material separating the layers and substantially separating said layers by a distance at least 10% of layer thickness.

3. A transformer according to claim 1 wherein said primary windings are layerless windings having a total thickness perpendicular to their winding sense which is greater by a factor of at least five than the thickness of the conductors constituting the windings.

4. The combination according to claim 1 wherein is further provided a secondary feed-back winding on said core, and means for statically shielding said secondary feed-back winding from said primary windings, said secondary winding being at least one layer of winding on said core contained within the confines of said primary windings, said means for shielding consisting of flexible metallic sheet material wound both internally and externally of said at least one layer of winding and located to statically shield said secondary winding from all the primary winding turns.

5. A wide band audio transformer for use as an output transformer of a power amplifier, said transformer having primary windings on a common core consisting of a first primary winding having two ends, a second primary winding having two ends, said first and second primary windings being bi-filarly related, said bi-filarly related primary windings being wound in a plurality of superposed multi-turn layers of bi-filar windings with the layers each including a large plurality of transpositions of the relative positions of the conductors of the bi-filar winding, said first primary winding having a first positive voltage terminal and a first anode terminal, said second primary winding having a second positive voltage terminal and a second anode terminal, the ends of said first and second primary windings to which said first anode terminal and said second positive terminal are connected being respectively immediately physically adjacent, the second anode terminal and said first positive voltage terminal being connected respectively to the remaining ends of said primary windings, and a secondary output winding substantially symmetrically positioned among said layers.

6. A wide band audio transformer for use as an output transformer of a power amplifier, said transformer having primary windings on a common core consisting of a first primary winding having two ends, a second primary winding having two ends, said first and second primary windings being bi-filarly related, said bi-filarly related primary windings being wound in a plurality of superposed multi-turn layers of bi-filar windings with the layers each including a large plurality of transpositions of the relative positions of the conductors of the bi-filar winding, said first primary winding having a first positive voltage terminal and a first anode terminal, said second primary winding having a second positive voltage terminal and a second anode terminal, the ends of said first and second primary windings to which said first anode terminal and said second positive terminal are connected being respectively immediately physically adjacent, the second anode terminal and said first positive voltage terminal being connected respectively to the remaining ends of said primary windings, a secondary feed-back winding layer substantially symmetrically interposel between a pair of adjacent ones of said multi-turn layers, and means for statically shielding said secondary feed-back winding comprising highly conductive material disposed intermediate said feed-back winding layer and multi-turn layers immediately adjacent to said feed-back winding layer.

7. A wide band audio transformer for use as an output transformer of a power amplifier, said transformer having primary windings on a common core consisting of a first primary winding having two ends, a second primary winding having two ends, said first and second primary windings being bi-filarly related, said bi-filarly related primary windings being wound in a plurality of superposed multi-turn layers of bi-filar windings, with the layers each including a large plurality of transpositions of the relative positions of the conductors of the bi-filar winding, said first primary winding having a first positive voltage terminal and a first anode terminal, said second primary winding having a second positive voltage terminal and a second anode terminal, the ends of said first and second primary windings to which said first anode terminal and said second positive terminal are connected being respectively immediately physically adjacent, the second anode terminal and said first positive voltage terminal being connected respectively to the remaining ends of said primary windings, a secondary feed-back winding, and means for statically shielding said secondary feed-back winding from said primary windings.

References Cited in the file of this patent

UNITED STATES PATENTS

| | | |
|---|---|---|
| 1,253,166 | Frank et al. | Jan. 8, 1918 |
| 1,320,980 | Bowman | Nov. 4, 1919 |
| 1,362,138 | Pratt | Dec. 14, 1920 |
| 2,310,684 | Farry | Feb. 9, 1943 |
| 2,430,738 | Schwennesen | Nov. 11, 1947 |
| 2,550,891 | Wald | May 1, 1951 |
| 2,654,058 | McIntosh | Sept. 29, 1953 |
| 2,710,380 | Buda | June 7, 1955 |
| 2,791,646 | Keroes | May 7, 1957 |

FOREIGN PATENTS

| | | |
|---|---|---|
| 617,660 | Great Britain | Feb. 9, 1949 |
| 689,488 | Great Britain | Mar. 25, 1953 |